United States Patent [19]
Schijf et al.

[11] Patent Number: 4,486,457
[45] Date of Patent: Dec. 4, 1984

[54] MARGARINE FAT BLEND, AND A PROCESS FOR PRODUCING SAID FAT BLEND

[75] Inventors: Robert Schijf; August M. Trommelen, both of Vlaardingen; Gabriël J. T. Lansbergen, 's-Gravenzande, all of Netherlands

[73] Assignee: Lever Brothers Company, New York, N.Y.

[21] Appl. No.: 473,461

[22] Filed: Mar. 9, 1983

[30] Foreign Application Priority Data

Mar. 12, 1982 [GB] United Kingdom ............... 8207358

[51] Int. Cl.$^3$ .......................... A23D 3/02; A23D 5/00
[52] U.S. Cl. ..................................... 426/603; 426/607
[58] Field of Search ................ 426/603, 604, 607, 608

[56] References Cited

U.S. PATENT DOCUMENTS 3,956,522  5/1976  Kattenberg et al. ............ 426/607 X
4,341,813  7/1982  Ward .............................. 426/607 X
4,386,111  5/1983  Van Heteren et al. .......... 426/607 X
4,388,339  6/1983  Lomneth et al. ............... 426/603 X Primary Examiner—Robert Yoncoskie
Attorney, Agent, or Firm—Milton L. Honig; James J. Farrell

[57] ABSTRACT

There is disclosed a margarine fat blend comprising a liquid oil and a hardstock predominantly of triglycerides from 2 saturated $C_{16-18}$-fatty acids and 1 saturated $C_{12-14}$-fatty acid. Said hardstock can be used at levels as low as 4% by weight along with liquid oils comprising triglycerides from polyunsaturated fatty acids, for producing diet margarines.

A process for producing said margarine fat blend is also disclosed, comprising interesterification of (a) triglycerides rich in $C_{16-18}$-fatty acid residues with (b) triglycerides rich in $C_{12-14}$-fatty acid residues and fractionation of the interesterified mixture.

25 Claims, No Drawings

MARGARINE FAT BLEND, AND A PROCESS FOR PRODUCING SAID FAT BLEND

The present invention relates to a fat blend suitable for producing margarines and spreads with a reduced fat content, particularly water-in-oil emulsion spreads with a relatively high level of polyunsaturated fatty acids, and to a process for producing said fat blend.

Fat blends suitable for producing such margarines and spreads comprise a liquid oil, which means an oil which at 10° C. is substantially free from crystallized fat, and a fat with a relatively high melting point, the so-called hardstock forming a matrix wherein the liquid oil is entrapped.

It is important for a margarine or spread to be easily spreadable without displaying oil exudation. It is also important that the margarine has a certain consistency at a temperature within the range of 15°-25° C. These requirements set a limit to the level of liquid oil which is the major source of polyunsaturated fatty acids, particularly of the linoleic type.

Efforts have been made to reduce as much as possible the level of hardstock in order to improve the oral response of margarine produced from said hardstock and increase the ratio of polyunsaturated fatty acid residues to saturated fatty acid residues, to achieve a value preferably ranging from 3.0 to 4.0. Reducing the level of hardstock to less than 10 wt% of the total fat blend turned out to be extremely difficult, since such low levels of hardstock result in an insufficient consistency of the final product. On the other hand, increasing the level of polyunsaturated fatty acids by incorporating substantial amounts of oils rich in linoleic acid such as safflower oil is uneconomical.

Applicants have found a new fat blend comprising a liquid oil and a relatively small proportion of a hardstock, which when incorporated in margarines leads to a consistency or hardness (expressed in C-value) which is higher than one would expect given said relatively small proportion of hardstock.

The use of such hardstock at relatively low levels enables the production of margarines with good organoleptic properties, due to the presence of relatively low proportions of high-melting fats, and with a high ratio of polyunsaturated to saturated fatty acids.

Applicants have further found a process for the preparation of margarine fat blends.

The present invention is based on the discovery that triglycerides having a carbon number ranging from 44 to 48, i.e. triglycerides from 2 saturated $C_{16-18}$-fatty acids and 1 saturated $C_{12-14}$-fatty acids, can constitute a very efficient hardstock, which means a hardstock which may be used at relatively low levels in products wherein such a property is highly desirable (particularly dietetic margarines).

The fat blend according to the invention comprises:
a liquid oil (i) which at 10° C. is substantially free from crystallized fat;
a fat (ii) in which 55-100 wt.% of the triglycerides consist of triglycerides (b) having a carbon number ranging from 44 to 48 and 0-45 wt.% of the triglycerides consist of triglycerides (a) having a carbon number ranging from 34 to 42 and triglycerides (c) having a carbon number ranging from 50 to 54.

The liquid oil (i) preferably consists of triglycerides in which at least 40% of the fatty acid residues are of the polyunsaturated type, such as sunflower oil, soybean oil, maize oil, saffloweroll, grapeseed oil or mixtures thereof. Ideally oil (i) consists of sunfloweroll, because it is readily available in large quantities at reasonable price and has good organoleptic properties. Said oil may constitute 70–96 wt.%, preferably 88 to 95 wt% of the total fat blend.

Fat (ii) is the hardstock component of the fat blend; it may constitute 4–30% by weight, preferably 4–12 wt% of the total fat blend. Triglycerides (b) comprise predominantly triglycerides from 2 saturated or monotrans fatty acids with a chain length of 16 or more carbon atoms and preferably 16 or 18 carbon atoms and 1 saturated fatty acid with a chain length of 12 or 14 carbon atoms. Fat (ii) preferably contains 60 to 100% of triglycerides (b) which have a carbon number ranging from 44 to 48. By carbon number is meant the sum of the carbon atoms in the 3 fatty acid residues in the triglyceride molecules.

Triglycerides (a), constituting part of fat (ii), may comprise the following triglycerides:
HML, $M_3$, $M_2H$, $M_2L$, $HL_2$, $ML_2$ and $L_3$,
wherein
H is a saturated or a mono-trans fatty acid residue with 16 or more carbon atoms,
M is a saturated fatty acid residue with 12 to 14 carbon atoms,
L is a saturated fatty acid residue with less than 12 carbon atoms.

Triglycerides (b) predominantly consist of $H_2M$ triglycerides as hereinbefore defined.

Triglycerides (c) predominantly consist of $H_3$ triglycerides as hereinbefore defined.

When the production of dietetic margarines is envisaged, the level of hardstock is kept at a minimum value, e.g. between 4 and 12 wt.%, in order to achieve a ratio of polyunsaturated fatty acid residues (linoleic acid) to saturated fatty acid residues preferably ranging from 3.0 to 4.0.

Fat (ii) can be obtained by interesterification, preferably random interesterification, of a mixture of triglycerides wherein the ratio of H- to M-fatty acids is within the range of 0.4 to 8.5, preferably 1.0 to 3.0.

Random interesterification is carried out under moisture-free conditions, preferably at 110°–140° C. in a vaccuum of about 2 mm Hg, in the presence of a catalyst such as an alkali alkoxide, an alkalimetal or an alkalimetal hydroxide.

It is also possible to produce fat (ii) by esterification of a suitable mixture of fatty acids with glycerol, for instance according to the following procedure:

One part of glycerol is mixed with about 3.5 to 3.8 parts of the fatty acids blend. The mixture of fatty acids and glycerol is rapidly heated in a jacketed vessel to a temperature of about 190° C., and subsequently maintained, for at least three hours, at a temperature of 220° C. to 225° C. The reaction is carried out, while stirring under atmospheric pressure in a vessel which is closed from the air by nitrogen. During the reaction, water is removed by distillation. After 3 to 4 hours' reaction time, the free fatty acid content of the mixture is determined. When the free fatty content remains unchanged, the reaction is finished and the excess of fatty acids is removed by distillation at a temperature of 240° C., at a pressure of 5 mm mercury. During distillation the free fatty acid content is determined again and as soon as an acid value of 4 is obtained, the reaction is stopped and the product is cooled to a temperature of 90° C. The hard fat mixture obtained is subsequently alkali-refined and bleached.

Fat (ii) is preferably produced by randomly interesterifying a partly or fully hydrogenated fat (b) selected from coconut-, babassu-, palmkernel-, tucum-, murumuru-, ouricurum-fat, mixtures thereof or fractions thereof having a melting point ranging from 30° to 41° C., with a fat (b), which can be fully or partly hydrogenated, fractionated or non-fractionated, wherein at least 60% of the fatty acid residues are $C_{16}$- or $C_{18}$-fatty acid residues. Fat (b) is preferably selected from palmfat, soybean oil, groundnut oil, sunflower oil, maize oil, rapeseed oil, having a melting point ranging from 50° to 71° C.; and fractionating the interesterified mixture.

Fractionation can be carried out in the absence of a solvent (dry-fractionation), in the presence of an organic solvent (wet fractionation) such as acetone or hexane, or in an aqueous solution of a surface-active agent (so-called Lanza fractionation), under conditions such that part and preferably the bulk of triglycerides (a) and (c) as hereinbefore defined is removed to yield a hardstock preferably having the following triglyceride composition:

Triglycerides (a): 0–20 wt.%
Triglycerides (b): 55–100 wt.%, ideally 65–100 wt.%
Triglycerides (c): 0–20 wt.%.

Fractionation is preferably carried out in an organic solvent, preferably in acetone and preferably in 2 or more steps, the first being performed at 22°–33° C., preferably 24°–29° C., to obtain a higher melting stearin fraction mainly containing triglycerides from 3 saturated fatty acids of the H-type as hereinbefore defined, and a lower melting olein fraction, which is further fractionated at 12°–24° C., preferably 15°–22° C., to obtain a second stearin fraction containing 55–100 wt.%, preferably 65–100 wt.% of triglycerides (b), 0–25 wt.%, preferably 0–10 wt.% of triglycerides (a) and 0–20 wt.%, preferably 0–10 wt% of triglycerides (c).

It is also possible to perform a first fractionation at 12°–24° C. to yield a stearin and an olein fraction and subsequently to fractionate the stearin at 22°–33° C. to yield a second stearin and a second olein (mid fraction enriched in triglycerides (b)).

Another useful fractionation method consists in mixing the mixture to be fractionated with a liquid oil such as soybean or sunflower oil and to perform the fractionation preferably in 2 steps, the first step being carried out at 22°–33° C., preferably at 24°–29° C., and the second step at 12°–24° C., preferably at 15°–22° C., to obtain a mid-fraction enriched in triglycerides (b).

In making margarines, or other edible plastic fat-in-water emulsions, the fat blends according to the invention can be emulsified in a conventional way with an aqueous phase, at a temperature at which the fat is liquid. The emulsion is then subjected to rapid chilling, in a conventional surface-scraped heat exchanger, e.g. a Votator apparatus, as described in "Margarine" by Andersen and Williams, Pergamon Press (1965), page 246 et seq.

The aqueous phase can contain additives which are customary for margarine, for example emulsifying agents, salt and flavours. Oil-soluble additives e.g. flavouring compounds, vitamins etc. can be included in the fatty phase. Generally the proportion of fatty phase in a margarine varies from about 75 to 84% of the emulsion depending on local statutory requirements for margarine. Alternatively higher proportions of the aqueous phase can be adopted in the production of so-called low-fat spreads or duplex spreads (O/W/O emulsions). The margarines and spreads according to the invention have a hardness expressed in C-value of at least 100 g/cm$^2$ and preferably from 220 to 400 g/cm$^2$ at 5° C., and at least 70 g/cm$^2$, preferably 100–250 g/cm$^2$ at 20° C.

It is a great advantage of the present invention, that margarine fats can be prepared containing a relatively small amount of the hardstock component and consequently a large quantity of liquid oil from which margarine can be made of sufficient hardness for tub-filling.

The invention will now be illustrated by the following examples:

EXAMPLES 1 AND 2

A hardstock was produced by esterifying glycerol with $C_{16}$-, $C_{18}$-, $C_{12-14}$-fatty acids, in proportions such that triglycerides of the $H_2M$ type were obtained. The composition of the hardstock is given in Table 1.

Margarines were produced in a Votator using this hardstock at a level of 7 and 9%, along with 93% and 91%, respectively, of sunflower oil as the fatty phase and an aqueous phase (16% by weight of the total product). The fat solids profile and hardness are given in Table 2.

TABLE 1

| Type of triglyceride | wt. % |
|---|---|
| 16 12 16 | 5.7 |
| 16 14 16 | 1.8 |
| 18 12 16 | 14.2 |
| 18 12 18 | 8.8 |
| 18 14 18 | 2.8 |
| 16 16 12 | 11.4 |
| 16 16 14 | 3.6 |
| 18 16 12 | 14.2 |
| 16 18 12 | 14.2 |
| 18 18 12 | 17.7 |
| 18 18 14 | 5.6 |

These margarines were compared with a margarine containing 87 wt% sunflower oil and 13 wt% of a non-fractionated fat obtained by random interesterification of equal amounts of palmkernel fat (m.p. 39° C.) and palm fat (m.p. 58° C.).

The interesterified mixture contained the same triglycerides as the synthetic mixture as well as other triglycerides.

TABLE 2

| Margarine prepared from | Example (1) 7 wt % synthetic hardstock and 93 wt % sunflower oil | Example (2) 9 wt % synthetic hardstock and 91 wt % sunflower oil | Comparative example 13 wt % non-fractionated hardstock stock and 87 wt % sunflower oil |
|---|---|---|---|
| Solids | | | |
| N10 | 7.9 | 10.3 | 11.2 |
| N20 | 4.3 | 6.6 | 6.9 |
| N30 | 0.0 | 0.0 | 2.7 |
| N35 | 0.0 | 0.0 | 1.0 |
| Hardness 3d 15° C., 1 d m.t.* | | | |
| C5 | 195 | 320 | 205 |
| C10 | 195 | 330 | 155 |
| C15 | 165 | 285 | 135 |
| C20 | 135 | 225 | 69 |

*3 days at 15° C. - 1 day at measuring temperature.

It is apparent from this table that margarines produced with a lower level of fractionated fat have an almost equal or higher hardness than the margarine produced with the non-fractionated fat.

The ratio of polyunsaturated to saturated fatty acids was 3.4 (for the sample containing 9% hardstock) and 3.8 (for the sample containing 7% hardstock. The ratio for the comparative sample was 2.7.

EXAMPLES 3 AND 4

A hardstock was produced by randomly interesterifying a mixture consisting of equal amounts of fully hardened palmkernel fat (m.p. 39° C.) and fully hardened palm fat (m.p. 58° C.) under nitrogen using 0.2% of sodium methoxide at 80° C. for a period of about ½ hour. The catalyst was destroyed by adding water. The fat was washed, dried and deodorized.

The interesterified mixture was fractionated in acetone. The ratio fat mixture:acetone was about 1:5.

A first fractionation was carried out at 26° C. This fractionation yielded a stearin and an olefin fraction. The olefin fraction was subsequently fractionated at 20° C. into a second stearin fraction and a second olein fraction.

The triglyceride composition was analysed by GLC. The results are summarized in Table 3.

The second stearin contained 17.2 wt% of triglycerides with a carbon number C of 44, 29,8 wt% of triglycerides with C46, 25.0 wt% of triglycerides with C48, all falling within the definition of the present invention for $H_2M$ (triglycerides (b)).

Thus, the total percentage of $H_2M$ triglycerides in this fraction was 72 wt%.

Margarines were produced in a Votator starting from an aqueous phase (16 wt%) and a fatty phase (84 wt%), consisting of (1) a fat blend containing 7% of the second stearin as hardstock and 93% sunflower oil; and (2) 10% of the second stearin as hardstock and 91% of sunflower oil.

As a reference a margarine was produced using 13% of a hardstock obtained by randomly interesterifying the same mixture as above but omitting (the double) fractionation.

The solid fat percentage (expressed as N-values, were determined as described in J.Am.Oil Chemists' Soc., Vol. 51, (1974), page 316), the hardness (expressed in C-values, was determined as described in J.A.O.C.S. 36 (1959), page 345-348).

From Table 4 it is clear that the hardness at 20° C. at levels of hardstock of 7 wt.% and 9 wt.% of the margarine according to the invention is superior to the hardness of the margarine obtained with the non-fractionated hardstock used at a level of 13 wt%.

The products according to the invention were easily spreadable at room temperature and had a good oral response when tested by a panel of experts.

TABLE 3

| Analytical data of the interesterified blend and the fractions obtained from the acetone fractionation | | | | |
|---|---|---|---|---|
| | interesterified blend | stearin | olein | 2nd stearin | 2nd olein |
| Fraction. temp. | — | 26° C. | | 20° C. | |
| yield (%) | 100 | 33 | 67 | 13 | 54 |
| N10 | 95.3 | 97.4 | 93.3 | 97.0 | 91.7 |
| N20 | 90.7 | 97.2 | 81.4 | 96.2 | 72.1 |
| N30 | 69.6 | 96.4 | 40.8 | 92.8 | 21.3 |

TABLE 3-continued

| | | | | | |
|---|---|---|---|---|---|
| N35 | 49.0 | | 9.5 | 81.8 | 2.2 |
| N40 | 27.5 | 91.7 | 0.4 | 39.6 | |
| N45 | 9.0 | | | 0 | |
| N50 | 0 | 45.1 | | | |
| GLC di/triglycerides (wt %) | | | | | |
| Tri 34/Di32 | 7.6 | 0.7 | 11.9 | 0.9 | 14.2 |
| Tri 36/Di34 | 5.0 | 0.7 | 7.4 | 0.9 | 9.0 |
| Tri 38/Di36 | 5.8 | 0.8 | 8.4 | 1.4 | 10.2 |
| Tri 40 | 8.1 | 1.3 | 11.6 | 3.9 | 3.6 |
| Tri 42 | 12.5 | 3.2 | 17.2 | 10.4 | 19.0 |
| Tri 44 | 11.5 | 6.6 | 14.0 | 17.2 | 13.1 |
| Tri 46 | 15.2 | 16.0 | 14.5 | 29.8 | 10.4 |
| Tri 48 | 13.9 | 22.2 | 9.3 | 25.0 | 5.1 |
| Tri 50 | 8.3 | 19.7 | 2.2 | 5.9 | 1.3 |
| Tri 52 | 7.6 | 19.1 | 1.5 | 2.7 | 1.5 |
| Tri 54 | 4.1 | 9.2 | 1.5 | 1.3 | 2.2 |
| GLC fatty acids (wt %) | | | | | |
| C 8:0 | 1.7 | 0.2 | 2.6 | 0.5 | 3.6 |
| C 10:0 | 1.7 | 0.4 | 2.5 | 0.9 | 3.0 |
| C 12:0 | 23.8 | 10.5 | 31.0 | 25.8 | 33.4 |
| C 14:0 | 8.6 | 7.1 | 9.3 | 9.2 | 9.5 |
| C 16:0 | 25.4 | 30.3 | 22.5 | 25.4 | 21.3 |
| C 18:0 | 35.5 | 50.5 | 28.0 | 37.2 | 25.4 |
| C 18:1 | 2.1 | — | 2.9 | — | 3.4 |
| C 18:2 | 0.3 | — | 0.5 | — | 0.5 |
| rest | 0.9 | 1.0 | 0.7 | 0.9 | 0.8 |

TABLE 4

| Margarines produced from | Example 3 7 wt % of fractionated hardstock (2nd stearin) and 93 wt % sunflower oil | Example 4 10 wt % of fractionated hardstock (2nd stearin) and 90 wt % sunflower oil | Comparative Ex. 13 wt % of non-fractionated hardstock |
|---|---|---|---|
| Solids | | | |
| N10 | 7.0 | 10.3 | 11.2 |
| N20 | 3.6 | 6.2 | 6.9 |
| N30 | 0.0 | 1.7 | 2.7 |
| N35 | 0.0 | 0.2 | 1.0 |
| Hardness 3 weeks storage at measuring temperature | | | |
| C5 | 240 | 370 | 280 |
| C10 | 185 | 325 | 160 |
| C15 | 190 | 310 | 140 |
| C20 | 130 | 200 | 95 |

The ratio of polyunsaturated fatty acids to saturated fatty acids was 3.8 (for the sample containing 7 wt.% of hardstock) and 3.2 (for the sample containing 10 wt. of hardstock).

In the comparative example this ratio was 2.7.

We claim:

1. A margarine fat blend comprising:
70-96 wt. % of a liquid oil (i) which at 10° C. is substantially free from crystallized fat; and
4-30 wt. % of a fat (ii) in which 55-100 wt. % of the triglycerides consist of triglycerides (b) predominantly being $H_2M$ triglycerides having a carbon number ranging from 44 to 48, and 0-45 wt. % of the triglycerides consist of triglycerides (a) being HML, $M_3$, $M_2H$, $M_2L$, $HL_2$, $ML_2$ and $L_3$ triglycerides having a carbon number ranging from 34 to 42 and triglycerides (c) predominantly being $H_3$ triglycerides having a carbon number ranging from 50 to 54;

wherein
H is a saturated or a mono-trans fatty acid residue with 16 or more carbon atoms, M is a saturated fatty acid residue with 12 to 14 carbon atoms, L is a saturated fatty acid residue with less than 12 carbon atoms.

2. A margarine fat blend according to claim 1, wherein the level of triglycerides (a) in fat (ii) ranges from 0 to 25 wt.%.

3. A margarine fat blend according to claim 1, wherein the level of triglycerides (c) in fat (ii) ranges from 0 to 20 wt.%.

4. A margarine fat blend according to claim 1, wherein oil (i) constitutes 88–96 wt.% and fat (ii) constitutes 4–12 wt.% of the total fat blend and the ratio of polyunsaturated to saturated fatty acids ranges from 3.0 to 4.0.

5. A margarine fat blend according to claim 1, wherein oil (i) consists of triglycerides in which at least 40% of the fatty acid residues are of the polyunsaturated type.

6. A margarine fat blend according to claim 5, in which oil (i) is selected from the group consisting of sunflower oil, safflower oil, soybean oil, maize oil and rapeseed oil.

7. A process for producing a fat blend according to claim 1, comprising mixing a liquid oil (i), which at 10° C. is substantially free from crystallized fat, with a fat (ii) in which 55–100% of the triglycerides, comprising of $H_2M$ triglycerides, have a carbon number ranging from 44 to 48.

8. A process according to claim 7, wherein fat (ii) is obtained by randomly interesterifying a mixture of triglycerides in which the ratio of saturated $C_{16-18}$-fatty acids to saturated $C_{12-14}$-fatty acids ranges from 0.4 to 8.5, and fractionating the interesterified mixture to obtain fat (ii).

9. A process according to claim 8, wherein the ratio of saturated $C_{16-18}$-fatty acids to saturated $C_{12-14}$-fatty acids ranges from 1.0 to 3.0.

10. A process according to claim 8, wherein fat (ii) is produced by randomly interesterifying a partly or fully hydrogenated, fractionated or non-fractionated fat (a) selected from the group consisting of coconut, ouricurum, babassu, palmkernel, tucum and murumuru fat, with a partly or fully hydrogenated, fractionated or non-fractionated fat (b) wherein at least 60% of the saturated fatty acid residues contain 16 or 18 carbon atoms.

11. A process according to claim 9, wherein a fat (a) has a melting point ranging from 30° to 41° C. and a fat (b) has a melting point ranging from 50° to 71° C.

12. A process according to claim 10, wherein fat (b) is selected from the group consisting of hydrogenated palm oil, soybean oil, ground nut oil, sunflower oil, rapeseed oil, maize oil and mixtures thereof.

13. A process according to claim 8, wherein fractionation of the interesterified mixture is carried out in the presence of an organic solvent.

14. A process according to claim 13, wherein fractionation is carried out in the presence of acetone.

15. A process according to claim 14, wherein the fractionation is carried out in two steps, the first step being performed at 22°–33° C. to obtain a higher melting stearin fraction which is discarded, and a lower melting olein fraction which is further fractionated at 12°–24° C. to obtain a second stearin containing at least 55% of triglycerides having a carbon number ranging from 44 to 48.

16. A process according to claim 15, wherein the first step is carried out at 24°–29° C. and the second step at 15°–22° C.

17. A process according to claim 14, wherein a first fractionation is carried out at 12°–24° C. to yield a higher melting stearin fraction and a lower melting olein fraction and subsequently a second fractionation of the stearin fraction is carried out at 22°–33° C. to yield a second stearin and a second olein containing at least 55% of triglycerides having a carbon number ranging from 44 to 48.

18. A process according to claim 7, wherein fat (ii) is obtained by esterifying glycerol with a mixture comprising $C_{12}$-, $C_{14}$-, $C_{16}$- and $C_{18}$ fatty acids.

19. A process according to claim 7, wherein in fat (ii) the sum of the level of triglycerides (a) with a carbon number ranging from 34 to 42 and the level of triglycerides (c) with a carbon number ranging from 50 to 54 is up to 45 wt.%.

20. A process according to claim 19, wherein a fat (ii) has a level of triglycerides (a) ranging from 0 to 25 wt.%.

21. A process according to claim 19, wherein a fat (ii) has a level of triglycerides (c) ranges from 0 to 20 wt.%.

22. A process according to claim 7, wherein 88–96 wt.% of oil (i) are mixed with 4–12 wt.% of fat (ii), to obtain a fat blend in which the ratio of polyunsaturated to saturated fatty acids ranges from 3.0 to 4.0.

23. A process according to claim 8, wherein oil (i) consists of triglycerides in which at least 40% of the fatty acid residues are of the polyunsaturated type.

24. A process for producing margarines and low-fat spreads, comprising (1) emulsifying an aqueous phase with a fat blend obtained according to claim 8 and (2) cooling and texturizing the emulsion to yield a product having a hardness expressed in C-value of at least 100 g/cm² at 5° C. and at least 70 g/cm² at 20° C.

25. A process according to claim 24, wherein the product has a hardness expressed in C-value of 220–400 g/cm² at 5° C. and of 100–250 g/cm² at 20° C.

* * * * *